April 11, 1950
L. GOOCH
2,503,615
ADJUSTABLE FREE-FLOATING BRAKE
Filed July 28, 1947
2 Sheets-Sheet 2
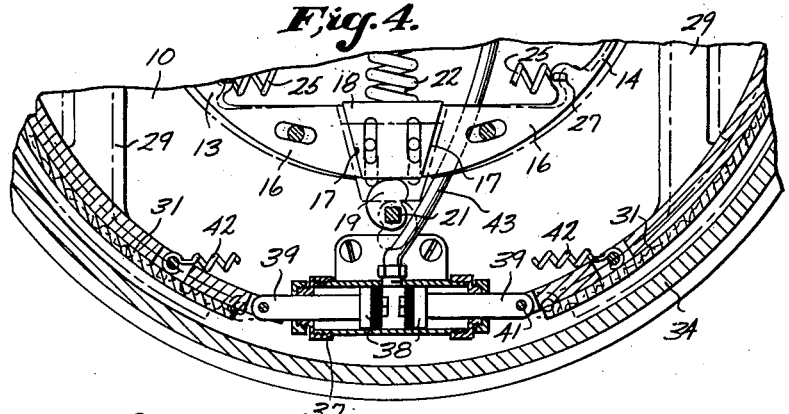
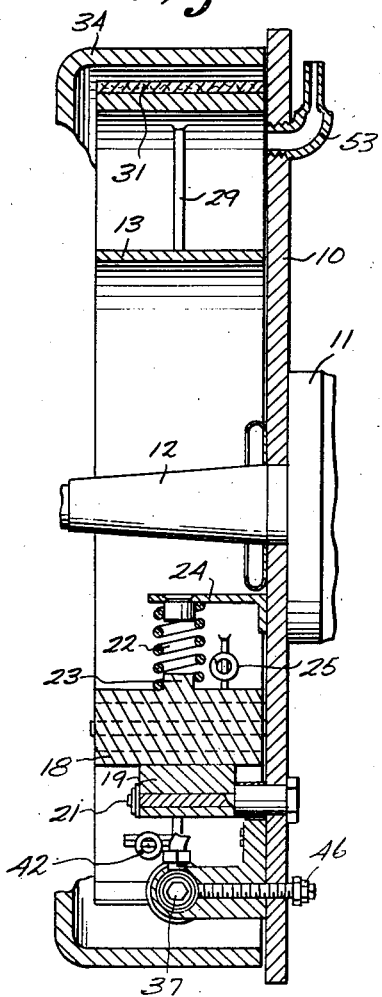
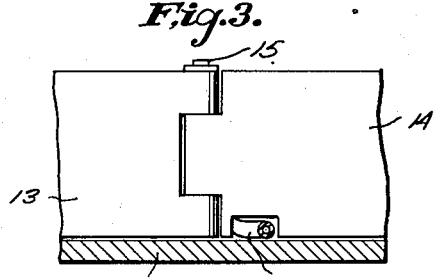
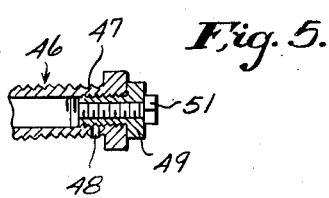
INVENTOR.
*Louis Gooch,*
BY *Victor J. Evans & Co.*
ATTORNEYS Patented Apr. 11, 1950

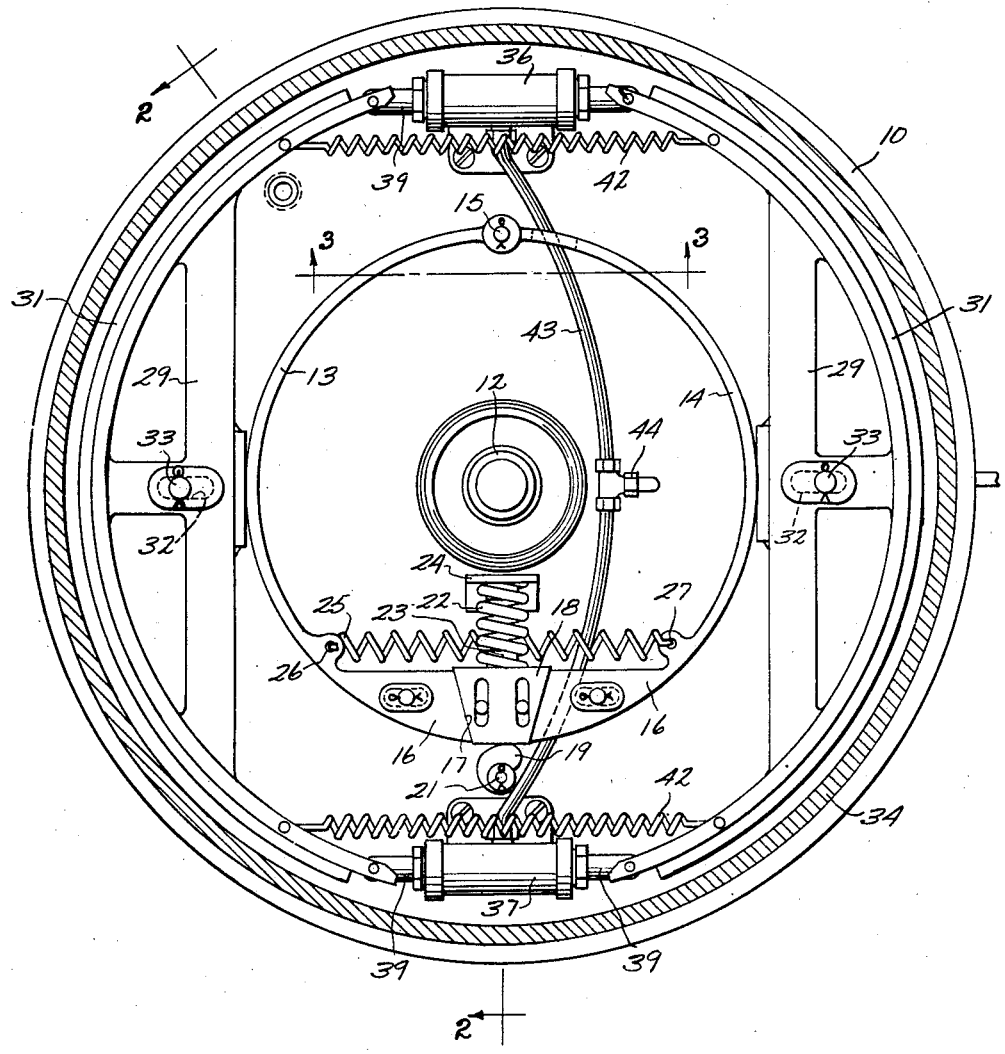

2,503,615

UNITED STATES PATENT OFFICE 2,503,615

ADJUSTABLE FREE-FLOATING BRAKE

Louis Gooch, Huntington Park, Calif.

Application July 28, 1947, Serial No. 764,153

1 Claim. (Cl. 188—79.5)

This invention relates to fluid operated brakes.

It is an object of the present invention to provide a brake wherein the brake shoes are mounted upon the brake housing for free floating movement and a central adjusting device operable upon the brake shoes to adjust the same simultaneously by the turning of a single adjusting member.

It is another object of the invention to provide a brake wherein the wear upon the brake lining is cut down and wherein the adjustment is effected with less effort than with the standard fluid operated brakes.

Other objects of the present invention are to provide a fluid operated brake which is of simple construction, inexpensive to manufacture and efficient in operation.

For a better understanding of the invention reference may be had to the following detailed description taken in connection with the accompanying drawing, in which:

Figure 1 is a transverse cross-sectional view taken through the brake housing and looking into the interior thereof and upon the operating and adjustable parts.

Figure 2 is a cross sectional view, in elevation, taken on line 2—2 of Figure 1, and looking in the direction of the arrows thereof.

Figure 3 is a fragmentary cross-sectional view looking upwardly upon the connection between divided adjusting parts.

Figure 4 is an enlarged cross-sectional view taken through the bleeding element to the fluid operating devices.

Figure 5 is a detail showing a longitudinal section through the outer end of one of the bleeder valves used in the hydraulic cylinder with the parts shown on an enlarged scale and with parts broken away.

Referring now to the figures, 10 represents a plate which is connected to an axle housing 11 from which extends an axle 12 to which is attached a wheel. Upon the plate 10 there is extended operating members 13 and 14 which are pivoted together as indicated at 15. These members are of semi-circular shape and are formed at their lower ends with an enlargement 16 having a tapered face 17. Between these tapered faces 17 there is extended a wedge 18 which bears against a cam 19 pivoted on a pin 21 extending through the plate 10 and adapted to be adjusted. A spring 22 is fitted over a projection 23 on the top of the wedge 18 and reacts against a bracket 24 extending outwardly from the plate 10. A tension spring 25 is connected between points 26 and 27 on the respective members 13 and 14. Each of the members 13 and 14 abuts a brake band support member with the band 13 abutting the member 29 and with the band 14 abutting the member 29—A, and each of the members 29 and 29—A has a brake band 31 thereon. Each of the brake band members has a slot 32 through which extends a pin 33. The brake band supporting members 29 and 29—A can be adjusted in and out to make engagement with a brake housing 34 to grip the same. The members 13 and 14 act as stops for limited inward movement. By adjusting the cam 19, the members 13 and 14 can be separated or placed closer together whereby to bring the brake members 29 either closer to the brake housing 34 or farther away from the same. The adjustment can be made to take up the wear which has been effected upon the brake band 31.

At the top and bottom of the plate 10 there are connected, operating cylinders 36 and 37 respectively, each of which having pistons 38 with piston rods 39 extending respectively from the opposite ends of the fluid actuated device 36 and connected with the ends of the brake members at a point as indicated at 41. A tension spring 42 located between the brake members will tend to draw the brake members together and the pistons 38 will be retracted into the casing of the fluid actuated device 36. A pipe 43 is connected between the fluid actuated devices 36 and 37 and receives fluid from a T fitting 44. When the brakes are to be operated fluid is extended into the pipe 43 and into the fluid actuated devices whereby to cause the brake members to be extended against the housing 34.

Connected to each fluid actuated device is a bleeder valve arrangement 46. This bleeder valve arrangement will not only permit the fluid to be drawn from the fluid actuated device but will also permit the air within the fluid system to be extracted. The valve arrangement is in three parts including a fitted sleeve 47 having a hole 48 therein, a screw 49 adapted to be adjusted out of the sleeve 47 to uncover the opening 48, and a screw 51 which is carried by the screw 49 and may be removed without removing the screw 49.

At the top of the plate 10 there is connected a fitting 53 to which an air nozzle can be connected to extend the air into the brake housing to clean the same and free it of dirt.

While various changes may be made in the detailed construction, it shall be understood that such changes shall be within the spirit and scope of the present invention as defined by the appended claim.

I claim:

A hydraulic brake arrangement comprising a plate, separable members bearing against the plate and pivoted together at one location thereon, means for separating or bringing together the separable members by adjusting them about their pivotal connection, brake members having brake band portions thereon connected respectively to the plate for sliding movement and adapted to be engaged by the adjustable members whereby their inward movement will be limited, fluid operated devices connected to the brake band members for separating the same to apply braking action, a brake housing for receiving the brake members, said adjustable members having enlarged ends with tapered surfaces thereon, said means for adjusting the same further including a wedge member, a cam pivoted on the disc plate and abutting the wedge whereby to elevate or permit the same to be lowered, spring means urging said means toward the cam, and spring means urging the enlarged ends of said adjustable members together.

LOUIS GOOCH.

REFERENCES CITED

The following references are of record in the file of this patent:

UNITED STATES PATENTS

| Number | Name | Date |
| --- | --- | --- |
| 2,051,088 | Kittle et al. | Aug. 18, 1936 |
| 2,082,229 | Stoner | June 1, 1937 |
| 2,144,025 | La Brie | Jan. 17, 1939 |
| 2,184,050 | Miler | Dec. 19, 1939 |
| 2,189,134 | Chard | Feb. 6, 1940 |
| 2,336,350 | Fields et al. | Dec. 7, 1943 |
| 2,347,571 | Linke | Apr. 25, 1944 |